United States Patent
Nishide

(10) Patent No.: US 7,161,748 B2
(45) Date of Patent: Jan. 9, 2007

(54) ZOOM LENS BARREL AND OPTICAL EQUIPMENT

(75) Inventor: Akihiko Nishide, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/938,338

(22) Filed: Sep. 9, 2004

(65) Prior Publication Data
US 2005/0052757 A1    Mar. 10, 2005

(30) Foreign Application Priority Data
Sep. 9, 2003   (JP)   ............... 2003-316937

(51) Int. Cl.
G02B 7/02     (2006.01)
G02B 15/14    (2006.01)

(52) U.S. Cl. .............. 359/813; 359/701; 359/822; 359/739

(58) Field of Classification Search ........... 359/701, 359/813
See application file for complete search history.

(56) References Cited
U.S. PATENT DOCUMENTS 5,376,983 A * 12/1994 Yamazaki et al. ........... 396/72
5,485,236 A * 1/1996 Arai et al. ................... 396/65
6,246,832 B1 * 6/2001 Terada ......................... 396/63
6,724,541 B1 * 4/2004 Noguchi ..................... 359/700

FOREIGN PATENT DOCUMENTS

JP    A 2000-321476    11/2000

* cited by examiner

Primary Examiner—Jordan Schwartz
Assistant Examiner—Jessica Stultz
(74) Attorney, Agent, or Firm—Morgan & Finnegan, L.L.P.

(57) ABSTRACT

For the purpose of miniaturizing a zoom lens barrel, a zoom lens of the present invention comprises one lens group which moves at the time of variable power, one diaphragm member which moves at the time of variable power, and a cam member which has a cam section for a lens group, which guides the movement of the above-mentioned lens group at the time of variable power, and a cam section for a diaphragms which guides the movement of the above-mentioned diaphragm member at the time of variable power, wherein the above-mentioned cam section for a lens group and the above-mentioned cam section for a diaphragm are coupled.

7 Claims, 6 Drawing Sheets

ZOOM LENS BARREL AND OPTICAL EQUIPMENT

BACKGROUND OF THE INVENTION

1. Field of the Invention

The present invention relates to a zoom lens barrel used for optical equipment such as a camera and a projector, and optical equipment using the zoom lens barrel. In particular, the present invention relates to a zoom lens barrel, which has a moving diaphragm mechanism, and optical equipment using this.

2. Related Background Art

Heretofore, what is known as a moving diaphragm mechanism which is interlocked with the zooming of a zoom lens barrel and moves in the direction of an optical axis has such construction that a cam groove for a flare diaphragm is provided on the periphery of a cam ring, a driven pin which is a cam follower of a flare diaphragm member fits into the cam groove, and the flare diaphragm moves in the direction of an optical axis according to a cam action because the cam ring rotates with an optical axis as a center, like a lens barrel disclosed in Japanese Patent Application Laid-Open No. 2000-321476.

However, in the above-mentioned lens barrel, a cam groove for moving a diaphragm member is provided on a cam ring and the cam groove is provided in the same phase (area) as cam grooves for moving a zooming system lens group. Here, the phase means an angle (position) in a rotary direction with an optical axis of a zoom lens as a center, and the same phase means the same position (area) in a thrust direction of a zoom lens barrel. Thereby, since it is necessary to provide a cam groove for guiding the movement of a diaphragm member, separately from a plurality of cam grooves for a zoom lens in a thrust direction on a cam ring, the length of the cam ring in the thrust direction increases. In consequence, there arises a possibility that the size of a lens barrel increases.

In addition, when the cam grooves are worked by machining, the dedicated cam groove for the diaphragm member becomes necessary in addition to the cam grooves for the zooming system lens group. Hence, there arises a problem that processing cost increases.

SUMMARY OF THE INVENTION

A zoom lens according to the present invention for the purpose of coping with the above-mentioned subjects has the following features:

one lens group which moves at the time of variable power, one diaphragm member which moves at the time of variable power, and a cam member which has a cam section for a lens group, which guides the movement of the above-mentioned lens group at the time of variable power, and a cam section for a diaphragms which guides the movement of the above-mentioned diaphragm member at the time of variable power, wherein the above-mentioned cam section for a lens group and the above-mentioned cam section for a diaphragm are coupled.

In addition, in the zoom lens mentioned above, it is preferable that a position corresponding to a tele end of the above-mentioned cam section for a lens group and a position corresponding to a wide end of the above-mentioned cam section for a diaphragm coincide approximately.

Furthermore, in the zoom lens mentioned above, it is preferable that a part of the above-mentioned cam section for a lens group and a part of the above-mentioned cam section for a diaphragm overlap. In this case, it is further preferable that the above-mentioned position corresponding to the wide end of the cam section for a diaphragm exists on a locus of the above-mentioned cam section between the above-mentioned position corresponding to the tele end of the cam section for a lens group, and the position corresponding to the wide end.

Moreover, with aiming at coping with the above-mentioned subjects, optical equipment according to the present invention is characterized in comprising the zoom lens mentioned above, and imaging a predetermined object on a predetermined plane by using the zoom lens.

Furthermore, with aiming at coping with the above-mentioned subjects, an image pickup apparatus according to the present invention is characterized in comprising the zoom lens mentioned above, and imaging an image of an object on an imaging plane by using the above-mentioned zoom lens.

In addition, with aiming at coping with the above-mentioned subjects, an image display apparatus is characterized in comprising at least one image display element and the zoom lens mentioned above, and projecting light from the at least one image display element, described above, on a projected surface by using the above-mentioned zoom lens.

DETAILED DESCRIPTION OF THE PREFERRED EMBODIMENTS

This embodiment aims at providing a zoom lens barrel which can effectively perform miniaturization without increasing a parts count, excels in impact resistance, and stably performs the movement of a moving diaphragm. Hereafter, such embodiments will be described with referring to drawings.

(Embodiment 1)

Figure 1:
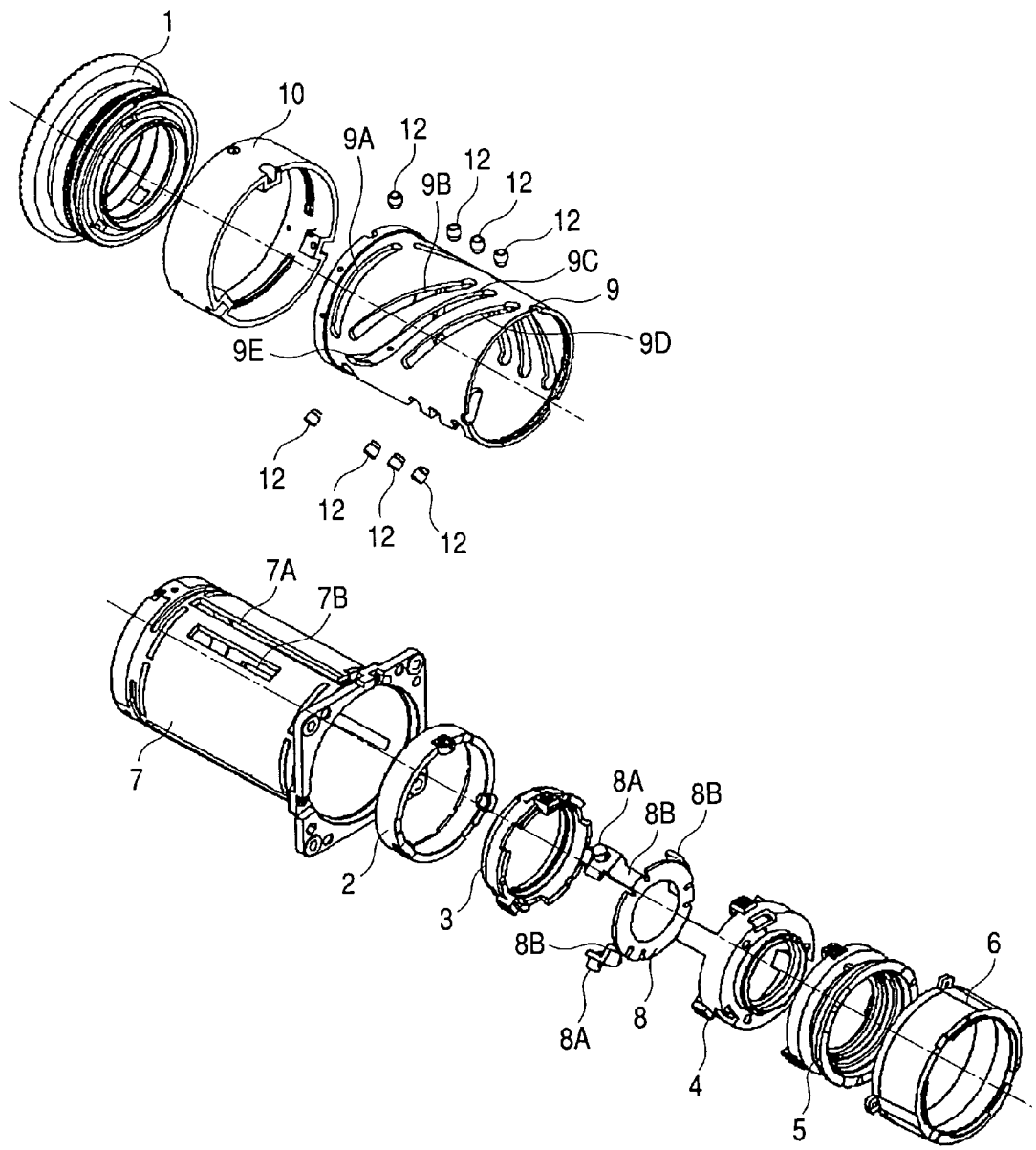
FIG. 1 is a perspective view showing a zoom lens barrel according to first and second embodiments of the present invention.

FIG. 1 is an exploded perspective view showing a zoom lens (lens barrel) showing the first embodiment of the present invention. In addition, this zoom lens barrel is used for an imaging apparatus (not shown), such as a camera, a projection apparatus (not shown) which projects an image, as optical equipment.

In FIG. 1, reference numeral 1 denotes a first group lens barrel holding a first lens group, reference numeral 2 denotes a second group lens barrel holding a second lens group, reference numeral 3 denotes a third group lens barrel holding a third lens group, reference numeral 4 denotes a fourth group lens barrel holding a fourth lens group, reference numeral 5 denotes a fifth group lens barrel holding a fifth lens group, reference numeral 6 denotes a sixth group lens barrel holding a sixth lens group, reference numeral 7 denotes a fixed barrel, reference numeral 8 denotes a moving diaphragm, reference numeral 9 denotes a cam ring which is a cam member, reference numeral 10 denotes a helicoid barrel, and reference numeral 12 denotes a runner which is a catching part.

The first lens group is a focal system lens group, a helicoid screw which is screwed with a helicoid screw provided in the inner diameter of the helicoid barrel 10 is provided in the outer periphery of the first group lens barrel 1, and when the first group lens barrel 1 is rotated around an optical axis manually or electrically, it moves in the direction of the optical axis to perform focusing. In addition, the helicoid barrel 10 is fixed with screws (not shown) etc., with being positioned on the fixed barrel 7.

The sixth group lens barrel 6 holds a relay system lens group, and is fixed to the fixed barrel 7 with screws (not shown) from a thrust direction.

The second group lens barrel 2, third group lens barrel 3, fourth group lens barrel 4, and fifth group lens barrel 5 are lens barrels which hold zooming system lens groups respectively, and are moved by predetermined amounts in the direction of an optical axis respectively when performing the zooming. Here, although it is made that this embodiment has such construction that the second, third, fourth and fifth groups move at the time of zooming, the present invention is not restricted to this, but at least one lens group may be driven at the time of zooming. In addition, although it is made that this embodiment has six-group construction, the present invention is not restricted to this, but a zoom lens may comprise at least one lens group driven at the time of zooming. Thus, it is essential only that there is at least one lens group.

The moving mechanism will be explained. The runner 12 is installed in each of three directions, that is, one per 120° (the angle may be approximately 120°, and it is desirable to be within 110° to 130°) in a radial direction of each of the second group lens barrel 2, third group lens barrel 3, fourth group lens barrel 4 and fifth group lens barrel 5. The runners 12 installed in each lens barrel are guided by keyways 7A for lens barrels which are straight line guide parts which are provided in the fixed barrel 7, and further, are guided by a cam lift 9A for the second group lens barrel, a cam lift 9B for the third group lens barrel, a cam lift 9C for the fourth group lens barrel and a cam lift 9D for the fifth group lens barrel, which are cam sections for the movement of respective lens barrel which are provided in the outer periphery of the cam ring 9, respectively. In this way, this embodiment is made to have such construction that the cam grooves and keyways for the second, third, fourth and fifth lens groups are provided in the cam ring, and convexities such as a runner are provided in each lens group barrel. Here, the present invention is not limited to this, it is possible to use a groove-like cam (a cam groove or a concave cam) or a convex cam for each cam lift which is a cam section. In addition, with corresponding to a shape of a cam, the above-mentioned runner 12 may be also constructed so as to engage with a groove or a concavity in the case of the cam groove or concave cam, to engage with a side face of a convex portion of a cam in the case of a convex cam, to sandwich a convex portion with two opposite runners, or to sandwich a convex portion of a cam with a concave portion by making this catching part concave. In addition, each keyway which is a straight-line guide part may be also constructed so as to be concave or convex, similarly to the above-mentioned cam.

The cam ring 9 is restricted in the movement in the direction of the optical axis to the fixed barrel 7 by bayonet structure etc. Each of the lens group barrels 2, 3, 4 and 5 moves by a predetermined distance in the direction of the optical axis with being guided by a cam locus of each of the cam lifts 9A, 9B, 9C and 9D by this cam ring 9 performing limited rotation (rotation around the optical axis) manually or electrically around the optical axis of the zoom lens, and moves to a predetermined position in the direction of the optical axis.

The moving diaphragm 8 removes a beam leading to a flare and a ghost. When being used as a projector lens of a projection apparatus which is optical equipment, a zoom lens barrel which has this moving diaphragm 8 enhances the image quality of a projection image (in particular, contrast is enhanced), and moves to a predetermined position in the direction of the optical axis according to zooming in order to make the effect suitable.

Because of optical conditions, the construction of this embodiment is that the moving diaphragm 8 is arranged between the third group lens barrel 3 and fourth group lens barrel 4, and the moving diaphragm 8 moves with changing a relative position with the third group lens barrel 3 according to a zoom position.

Figure 2:
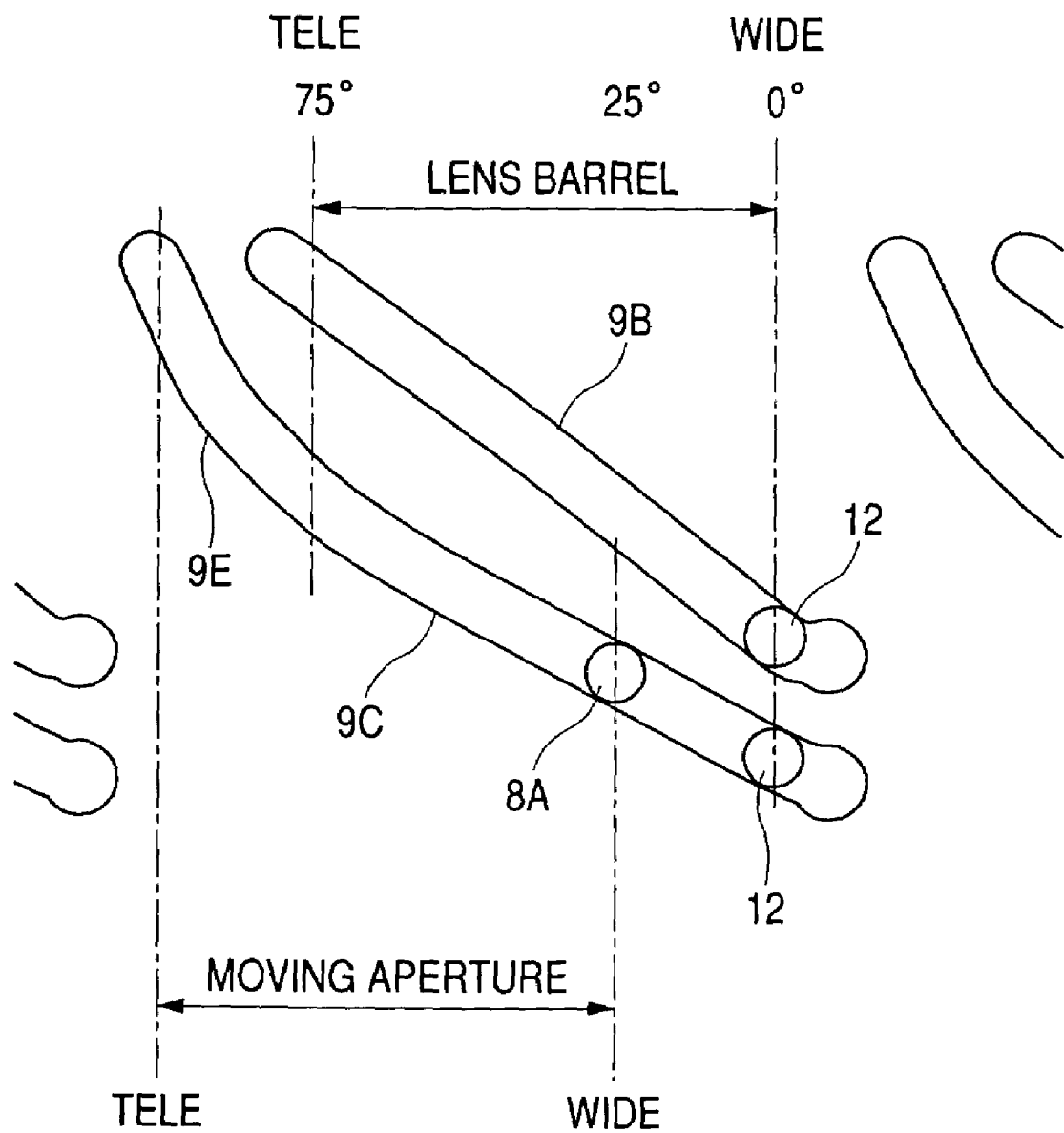
FIG. 2 is a developed view showing a cam ring in the zoom lens barrel of the first embodiment.

FIG. 2 is a developed view of the cam ring 9 shown in FIG. 1, and a diagram in view of the cam lift 9B for the third group lens barrel and the vicinity of the cam lift 9C section for the fourth group lens barrel, which are developed, from the outside, and a mechanism of operation of the moving diaphragm 8 will be explained by using FIGS. 1 and 2. Each cam follower 8A which is a catching part is provided every 120° in three locations on the outer periphery of the moving diaphragm 8. The cam follower 8A is engaged into the keyway 7B for a moving diaphragm, which is a straight line guide part which is provided in parallel to the optical axis in a position, whose phase is different from that of the above-mentioned keyway 7A for a lens barrel, on a side part of the fixed barrel 7, and is guided in the direction of the optical axis.

As shown in FIG. 2, the cam lift 9C for the fourth group lens barrel provided in the cam ring 9 is connected with the cam lift 9E for the moving diaphragm which is a cam section provided in the outside of the tele end, the cam lift 9C into which the cam follower 8A of the moving diaphragm 8 is engaged. Accordingly, the moving diaphragm 8 moves in the direction of the optical axis because the cam ring 9 performs the limited rotation around the fixed barrel 7 similarly to the second group lens barrel 2, third group lens barrel 3, fourth group lens barrel 4, and fifth group lens barrel 5.

In this embodiment, it is made that a zoom turning angle (angle of the cam ring rotating at the time of zooming from the tele end to the wide end) is 75°, a phase of the keyway 7A for the lens barrels, and the keyway 7B for the moving diaphragm is 25°, and an angle (a phase area or an angular range of an area, in which the dedicated cam lift for the moving diaphragm is provided, around the optical axis) of the cam lift 9E for the moving diaphragm is 25°. Thereby, the cam follower 8A of the moving diaphragm 8 is guided by the cam lift 9C for the fourth group lens barrel in an area from the wide end to a turning angle of 50° (an angle obtained by subtracting an angular range of the dedicated cam lift 9E for the moving diaphragm from the zoom turning angle), and is guided by the cam lift 9E for the moving diaphragm (dedicated to the moving diaphragm) in an area of the turning angle of 50° to 75°, that is, an area near the tele end. Accordingly, a part of the cam lift 9C for the fourth group lens barrel not only guides the fourth group lens barrel 4, but also guides the moving diaphragm 8.

Figure 3:
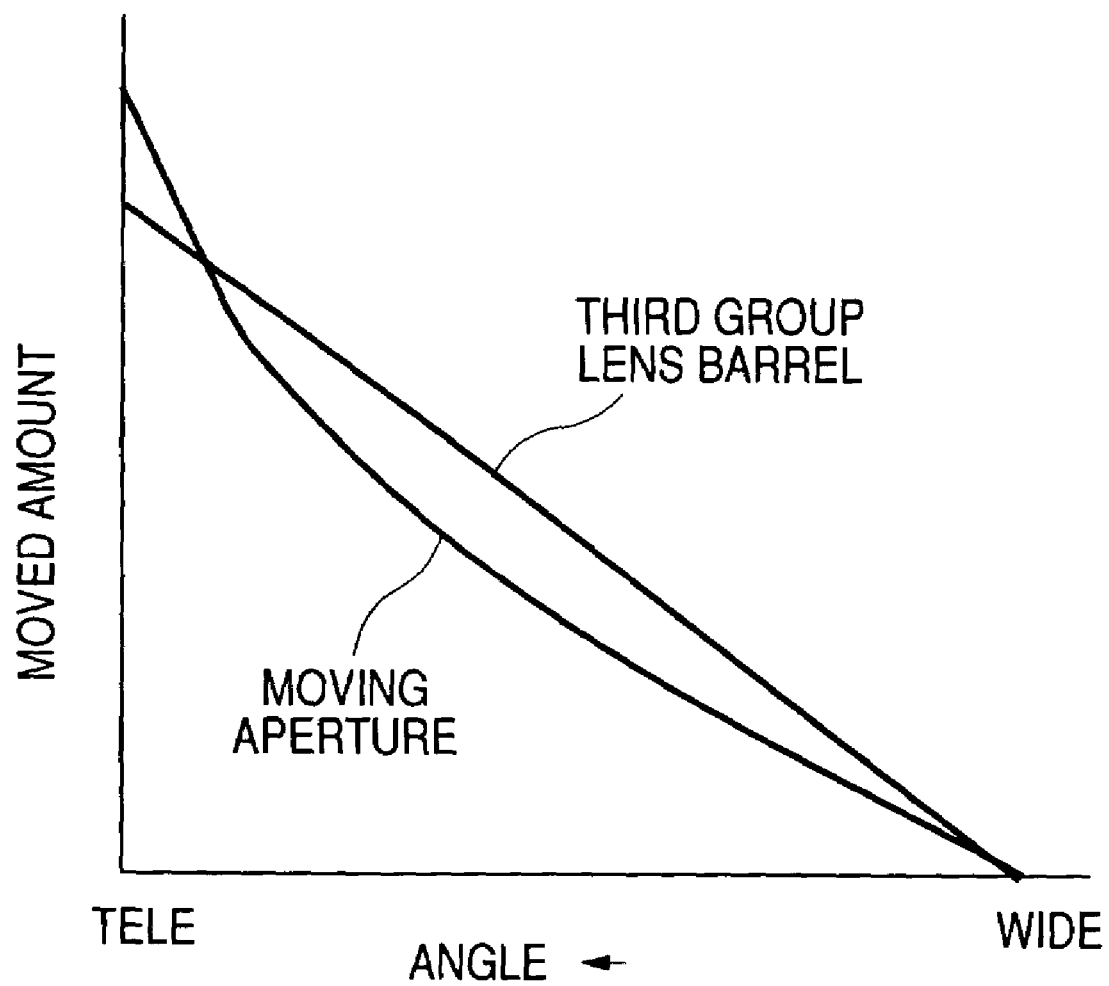
FIG. 3 is a diagram for explaining the operation of the first embodiment.

FIG. 3 is an explanatory diagram showing the relationship between the turning angle of the cam ring and the movement amount from a position in the wide end to a magnified conjugation side (an object side in a camera or a screen side in a projector) in both of the third group lens barrel 3 and the moving diaphragm 8. A change of a relative position between the moving diaphragm 8 and third group lens barrel 3 by zooming will be explained by using FIGS. 2 and 3.

When referring to shapes of the cam lift 9B for the third group lens barrel, the cam lift 9C for the fourth group lens barrel, and the cam lift 9E for the moving diaphragm, it can be seen that a relative distance becomes large according to rotation until the turning angle of the cam ring 9 from the wide end arrives at about 50° from the wide end, and that the relative distance becomes small in a zooming area where the turning angle exceeded 50°, that is, an area near the tele end. Thus, in a phase of rotating by a half of the zoom turning angle towards the tele end from the wide end, the distance between the third group lens barrel and moving diaphragm continues monotone increase. In a phase of arriving at about one-thirds of the zoom turning angle from the tele end, that is, at an angular range which is smaller than a half and larger than one fourth, the distance between the third group lens barrel and moving diaphragm begins monotone decrease, and the distance between the third group lens barrel and moving diaphragm in a phase of arriving at the tele end becomes shorter than the distance between the third group lens barrel and moving diaphragm in the wide end.

In order to obtain a suitable projection image near the tele end in optical performance, the zoom lens barrel of this embodiment (when used as a projector lens of a projection apparatus) is made to have such construction that omits ambient light flux by shortening the distance between the third group lens barrel 3 and moving diaphragm 8 near the tele end. In addition, in locations other than the vicinity of the tele end, since it is not necessary to omit luminous flux by the moving diaphragm 8, the moving diaphragm 8 is located in an area where the moving diaphragm 8 does not omit luminous flux. Thus, an area in which the dedicated cam lift for the moving diaphragm is formed is provided in the tele end side of the cam lift for the fourth group lens barrel.

In this way, in this embodiment, since ambient light flux is omitted only near the tele end in optical performance and it is not necessary to omit ambient light flux in the other locations, it becomes possible that the cam lift for the movement of the moving diaphragm 8, and the cam lift for the movement of the fourth group lens barrel 4 share a part of the cam lift 9C for the fourth group lens barrel 4. Of course, the cam lift to be shared is not limited to the cam lift for the fourth group lens barrel, but any cam lift among the cam lifts for the second, third and fifth group lens barrels may be used. In addition, in this embodiment, although it is set that the moving diaphragm moves on a locus different from that of the fourth group lens barrel near the tele end, of course, it may be set that the moving diaphragm moves on a locus different from that of the fourth group lens barrel near the wide end. That is, the area in which the dedicated cam lift for the moving diaphragm is formed may be provided in the wide end side of the cam lift for the fourth group lens barrel (even if the area is set at an area where the moving diaphragm uses near the wide end).

In addition, in this embodiment, a central axis of the runner 12 installed in each lens barrel approximately intersects with the optical axis (that is, the central axis of the runner approximately coincides with the radial of a circle, whose center is the optical axis, in a plane perpendicular to the optical axis of the zoom lens). The longitudinal direction of the keyway 7A for the lens barrels which guides each runner 12 is approximately parallel to the optical axis of the zoom lens, and the depth direction of the keyway 7A is provided in approximate parallel to the central axis of the runner 12 (radial of a circle, whose center is the optical axis in a plane perpendicular to the optical axis of the zoom lens). Furthermore, a cross direction of the keyway is a direction approximately perpendicular to the radial of a circle, whose center is the optical axis, in a plane perpendicular to the optical axis of the zoom lens.

Furthermore, the fixed barrel 7 of this embodiment is a molded member produced by die molding, and the keyway 7A for lens barrels is made by an profile slide which operates in parallel to the central axis of the runner 12 (an orthogonal direction of the optical axis). On the other hand, the central axis of the cam follower 8A of the moving diaphragm 8 also approximately intersects with the optical axis. But, in order to produce the shape of the keyway 7B for the moving diaphragm parallel to the optical axis and the central axis of the cam follower 8A similarly to the keyway 7A for lens barrels, a profile slide in a direction different from the above-mentioned profile slide becomes additionally necessary, and hence, die cost increases. Hence, by making one side of a guide surface of the keyway 7B for the moving diaphragm in this embodiment a shape parallel to the central axis of the cam follower 8A, and making another surface be approximately parallel to a guide surface of the keyway 7A for lens barrels, the increase of the profile slide direction is suppressed (the keyway 7A for lens barrels and the keyway 7B for the moving diaphragm which is made the above-mentioned guide surface are made by one profile slide).

As mentioned above, the keyway 7B for the moving diaphragm is provided in the fixed barrel 7 with differing from the keyway 7A for lens barrels in a phase, and the cam lift 9E for the moving diaphragm is provided in a phase different from the cam lift for lens barrels. Thereby, since there is no need of providing the dedicated cam lift for the moving diaphragm among four types of cam lifts for lens barrels, it is possible to shorten the thrust length of the cam ring 9 (the length in the direction of the optical axis), and hence, it is possible to effectively shorten the overall length of the lens.

In addition, since the number of cam lifts is made one by connecting the cam lift 9E for the moving diaphragm and the cam lift 9C for the fourth group lens barrel, it is processible at one step to produce the cam lift by machining. Hence, processing time is shortened in comparison with the case of separately machining two types of cam lifts, and hence, there is a merit of being able to attain cost reduction.

Next, the assembly procedure of the zoom system lens barrels and moving diaphragm 8 of the zoom lens barrel (projector lens) of this embodiment will be explained.

The cam ring 9 is inserted into and installed in the fixed barrel 7. At this time, the fixed barrel 7 and cam ring 9 are in the state that it is rotatable around the optical axis and is restricted in the thrust direction (the direction of the optical axis) by bayonet engagement. Furthermore, by fastening screws (not shown) in the cam ring 9 from a radial direction (a direction orthogonal to the optical axis), the cam ring 9 is given rotational regulation so as not to rotate more than the zoom area.

Next, the second group lens barrel 2 is inserted inside the fixed barrel 7 from a flange side (a direction where the sixth group lens barrel 6 is fixed), and the runner 12 is installed in the second group lens barrel 2 in the state that alignment is performed so that the runner 12 can be installed in a space where the keyway 7A and cam lift 9A for the second group lens barrel intersect. Similarly, the third group lens barrel 3 is aligned in a space where the keyway 7A and cam lift 9B for the third group lens barrel intersect, and the runner 12 are installed.

Next, the moving diaphragm 8 is installed. Since the cam follower section 8A of the moving diaphragm 8 is installed in an arm section 8B with elasticity, the cam follower 8A is engaged into and installed in a space, where the keyway 7B and cam lift 9C for the fourth group lens barrel intersect, from the flange side to the inner diameter side of the fixed barrel 7 in the state that the arm section 8B of the moving diaphragm 8 is bent in the inner diameter direction. Here, since a seat for installing a screw for fixing the runner etc. also besides the runner for the moving diaphragms 8 becomes unnecessary because the cam follower 8A of the moving diaphragm 8 is united, this is advantageous also in view of a space.

Then, similarly to the second group lens barrel 2, also in regard to the fourth group lens barrel 4 and fifth group lens barrel 5, alignment is performed so that each runner position may suit a space where the keyway 7A and cam lift 9C for fourth group lens barrel intersect, and a space where the keyway 7A and cam lift 9D for the fifth group lens barrel intersect, respectively, and each runner 12 is installed in each lens barrel for the assembly to be completed.

Figure 4:
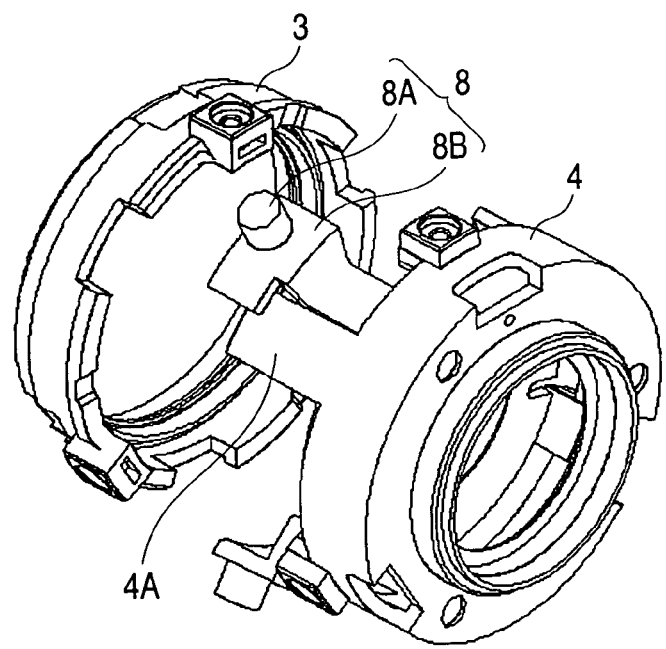
FIG. 4 is a perspective view for explaining a part of the zoom lens barrel according to the first embodiment.
Figure 5:
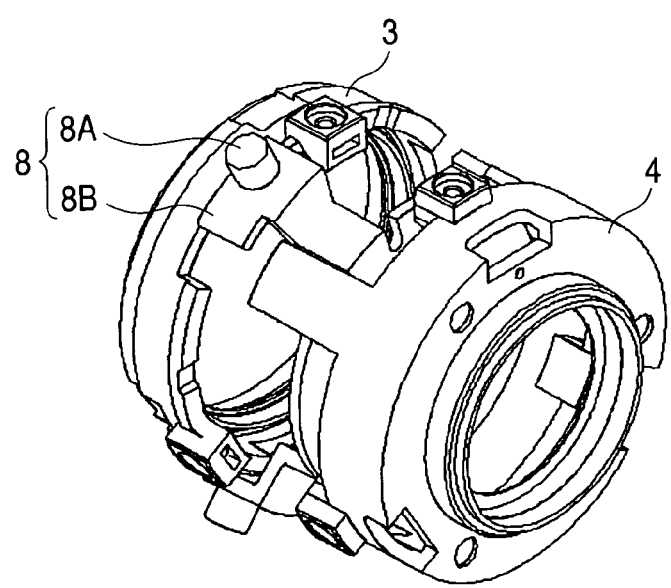
FIG. 5 is a perspective view for explaining a part of the zoom lens barrel according to the first embodiment.

FIG. 4 is a perspective view showing the positional relation among the third group lens barrel 3, fourth group lens barrel 4 and moving diaphragm 8 in the wide end, and FIG. 5 is a perspective view showing the positional relation in the tele end. The impact resistance of the moving diaphragm 8 will be explained by using these diagrams.

As FIG. 4, in the wide state, a backup section (regulating section) 4A which is a part of the fourth group lens barrel 4 is located in an inner diameter side of the arm section 8B of the moving diaphragm 8, and a play amount (gap) between the inner diameter of the arm section 8B and the outer diameter of the backup section 4A is set to be not more than an engagement amount (gap) between the cam follower 8A and cam lift 9E for the moving diaphragm in the thrust direction.

In addition, as shown in FIG. 5, the arm section 8B of the moving diaphragm 8 is restricted in the inner diameter side by the outer peripheral section of the third group lens barrel 3 in the tele state, and the play amount in the radial direction at this time is set to be not more than engagement amounts between the cam follower 8A, and cam lift 9C for the fourth group lens barrel and cam follower 9E for the moving diaphragm. In addition, it is made that, also in positions other than the wide end and tele end, the arm section 8B of the moving diaphragm 8 has such construction that is restricted in the inner diameter side by the third group lens barrel 3 or fourth group lens barrel 4, or both of the third group lens barrel 3 and fourth group lens barrel 4, and is restricted in the bending toward the inner diameter side.

The above-described construction prevents the cam follower 8A from separating from the cam lift 9C for the fourth group lens barrel or cam lift 9E for the moving diaphragm by the arm section 8B of the moving diaphragm 8 bending when impact is applied to the zoom lens barrel or the like.

(Embodiment 2)

Next, a second embodiment of the present invention will be explained by using FIGS. 6 and 1.

Figure 6:
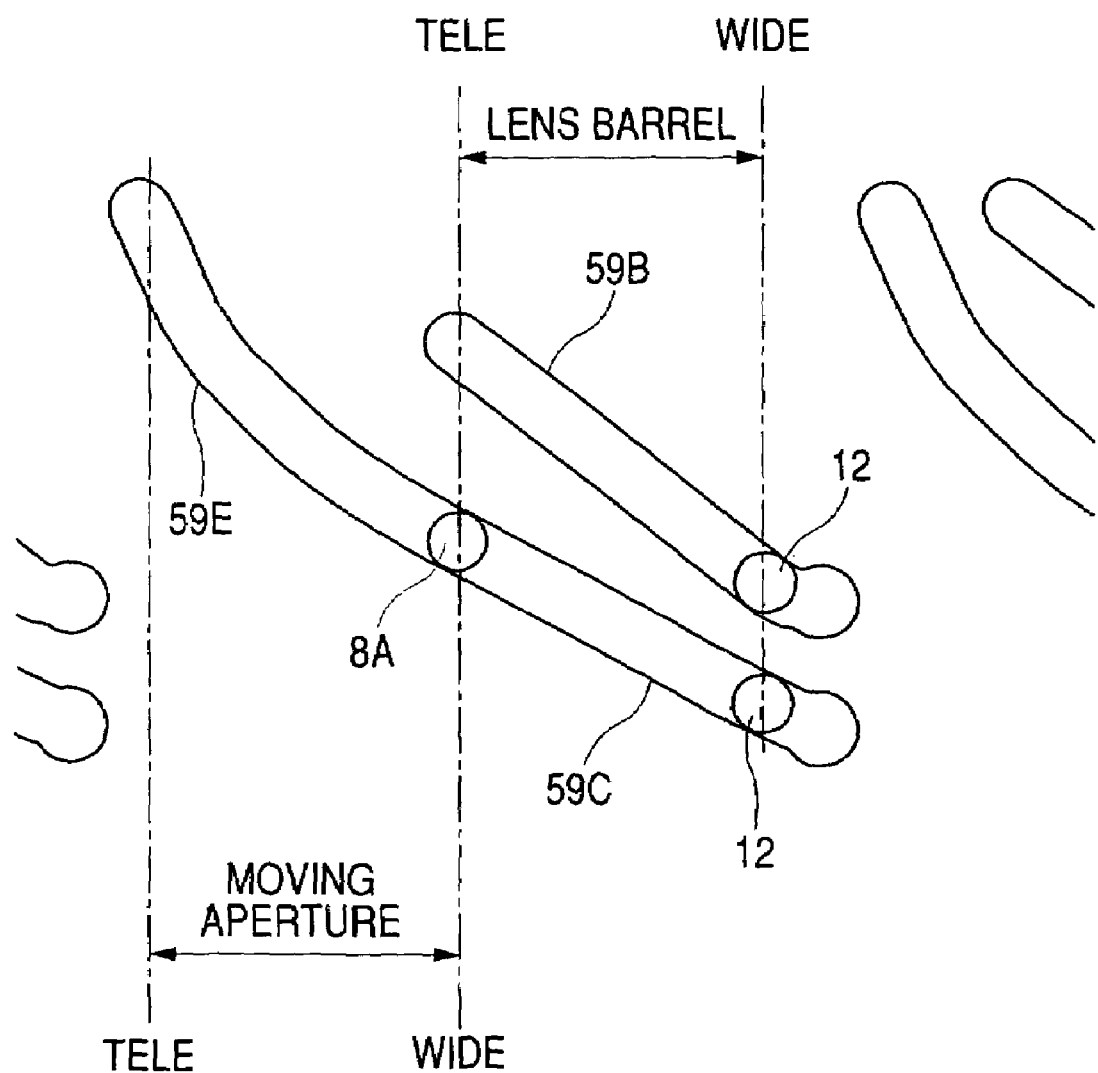
FIG. 6 is a developed view showing a cam ring in the zoom lens barrel of the second embodiment.

FIG. 6 is a developed view of a projector lens in the second embodiment, and is a diagram in view of the outside of the developed vicinity of the cam lift for the third group lens barrel and cam lift for the fourth group lens barrel. In addition, a zoom lens barrel (projector lens) of the second embodiment is different from the zoom lens barrel (projector lens) in the first embodiment on a keyway for a moving diaphragm which is provided in the fixed barrel 7, a cam lift for a second group lens barrel which is provided in the cam ring 9, a cam lift for a third group lens barrel, a cam lift for a fourth group lens barrel, a cam lift for a fifth group lens barrel and a cam lift for the moving diaphragm, and is common in other construction.

In the following explanation, let the keyway for the moving diaphragm be 57B (corresponding to 7B in FIG. 1, not shown in FIG. 6), let the cam lift for the second group lens barrel be 59A (corresponding to 9A in FIG. 1, not shown in FIG. 6), let the cam lift for the third group lens barrel be 59B (59B in FIG. 6), let the cam lift for the fourth group lens barrel be 59C (59C in FIG. 6), let the cam lift for the fifth group lens barrel be 59D (corresponding to 9D in FIG. 1, not shown in FIG. 6), and let the cam lift for the moving diaphragm be 59E (59E in FIG. 6). Here, in FIG. 6, although the keyway 57B for the moving diaphragm, the cam lift 59A for the second group lens barrel, and the cam lift 59D for the fifth group lens barrel are omitted in illustration, they correspond to the counter members, but are different in shapes and formed positions.

The keyway 57B for the moving diaphragm is provided in a phase of rotating by 50° from the keyway 7A for lens barrels. In addition, the cam lift 59A for the second group lens barrel, the cam lift 59B for the third group lens barrel, the cam lift 59C for the fourth group lens barrel, and the cam lift 59D for the fifth group lens barrel are provided in an area with a turning angle of 50°. Furthermore, the cam lift 59E for the moving diaphragm is provided in the form of connecting with an area of 50° from the tele end of the cam lift 59C for the fourth group lens barrel.

In this embodiment, the zoom turning angle is 50°, and since the keyway 57B for the moving diaphragm and the keyway 7A for lens barrels have 50° of phase difference, the cam follower 8A of the moving diaphragm 8 is not guided only by the cam lift 59E for the moving diaphragm at the time of zooming. That is, although a position of the tele end of the cam groove for the fourth group lens barrel and a position of the wide end of the cam groove for the moving diaphragm approximately coincide and both of these cam grooves are connected, the fourth group lens barrel and moving diaphragm are guided by the cam grooves, and move to mutually different areas in zooming. Accordingly, a point that there is not a portion, which moves the moving diaphragm 8 (guides the movement of the moving diaphragm 8), on the cam lift 59C for the fourth group lens barrel differs from the first embodiment explained in FIG. 1.

As described above, one cam lift is separated into a cam lift area for the lens barrels and a cam lift area for the moving diaphragms according to an area and there is no shared section. Hence, since it becomes possible to freely set a cam lift (cam profile) for moving a moving diaphragm, it becomes possible to perform the more delicate operation of the moving diaphragm.

Figure 7:
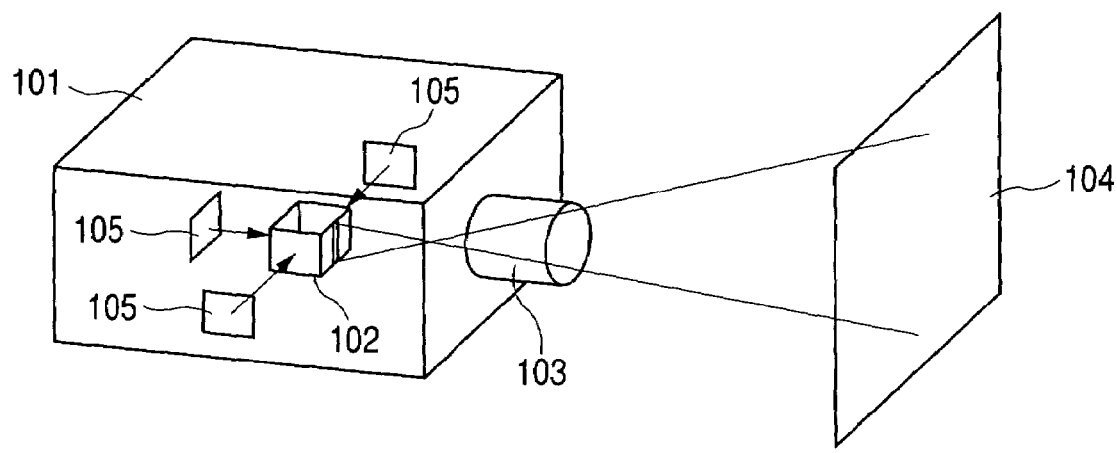
FIG. 7 is a perspective view at the time of applying the zoom lens according to the first and second embodiments to an imaging apparatus.

FIG. 7 shows an example that the zoom lens according to the above-mentioned embodiment is applied to an image projection apparatus (projector). Here, reference numeral 101 denotes a main body of the image projection apparatus, which illuminates three image display elements (TN type reflective or transmissive liquid crystal display device) 105 with light from a light source not shown, synthesizes the light from each element by a color composing system 102, and projects the synthesized light on a projected surfaces 104 such as a screen by using a projector lens 103. Here, the number of image display elements may be not three but one, two or four. Furthermore, although an object having a shape like one piece of cross-dichroic prism is shown as the color composing system here, of course, a plurality of dichroic mirrors may perform color composition, or a plurality of polarization beam splitters may perform the color composition. In addition, after making it possible to secure an angle of visibility by installing a lenticular lens, transmission type diffuser, or the like in the projected surface 104 such as a screen, the present invention may be used as a so-called rear projection type projector. In this image projection apparatus, the zoom lens barrel of the present invention is used as a lens barrel for the projector lens 103.

Figure 8:
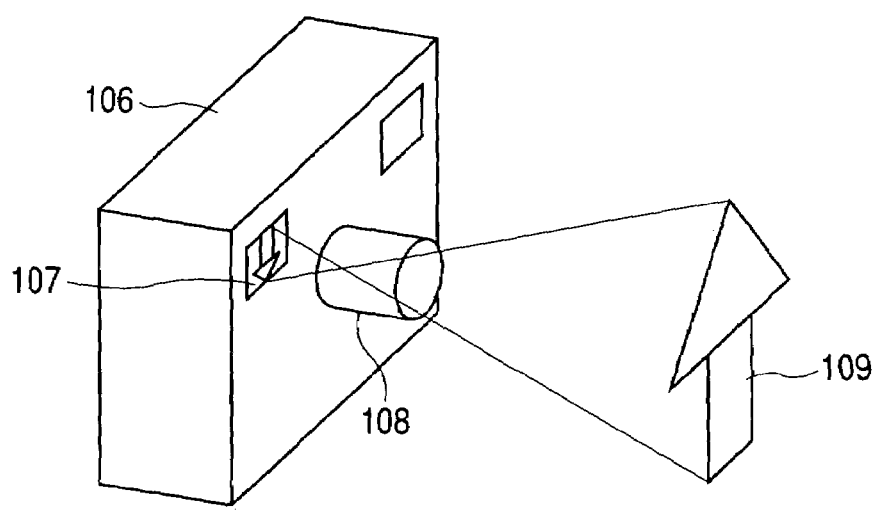
FIG. 8 is a perspective view at the time of applying the zoom lens according to the first and second embodiments to an image projection apparatus.

FIG. 8 shows an example that the zoom lens according to the above-mentioned embodiment is applied to an imaging apparatus. Here, reference numeral 106 denotes a main body of the imaging apparatus (camera). Light from an object 109 is imaged through a zoom lens 108 for image pickup on an imaging plane (surface of an image pickup element such as a film plane, CCD, or the like) 107. In this imaging apparatus, the zoom lens barrel of the present invention is used as a lens barrel for the zoom lens 108 for image pickup.

This embodiment can provide a zoom lens barrel which can effectively perform miniaturization without increasing a parts count, excels in impact resistance, and stably performs the movement of a moving diaphragm.

This application claims priority from Japanese Patent Application No. 2003-316937 filed Sep. 9, 2003, which is hereby incorporated by reference herein.

What is claimed is:

1. A zoom lens, comprising:
   a lens group which moves at the time of zooming;
   a diaphragm member having a cam follower which moves at the time of zooming; and
   a cam member which has a first cam section for the lens group which guides the movement of the lens group at the time of zooming, and a second cam section for the diaphragm member which guides the movement of the diaphragm member at the time of zooming, the first cam section and second cam section each having a cam groove,
   wherein the first cam section for the lens group and the second cam section for the diaphragm member are coupled so that the cam follower of the diaphragm member is guided on the same cam groove as the first cam section for the lens group.

2. The zoom lens according to claim 1, wherein a position corresponding to a tele end of the first cam section for the lens group and a position corresponding to a wide end of the second cam section for the diaphragm member coincide approximately.

3. The zoom lens according to claim 1, wherein a part of the first cam section for the lens group and a part of the second earn section for the diaphragm member overlap.

4. The zoom lens according to claim 3, wherein a position corresponding to a wide end of the second cain section for the diaphragm member exists on a locus of a cam section between a position corresponding to a tele end of the first cain section for the lens group and a position corresponding to a wide end of the first earn section for the lens group.

5. Optical equipment, comprising: the zoom lens according to claim 1, wherein a predetermined object is imaged on a predetermined plane by using the zoom lens.

6. An imaging apparatus, comprising: the zoom lens according to claim 1, wherein an object is imaged on an imaging plane by using the zoom lens.

7. An image display apparatus, comprising: at least one image display element; and the zoom lens according to claim 1, wherein light from the at least one image display element is projected on a projected surface by using the zoom lens.

* * * * *

UNITED STATES PATENT AND TRADEMARK OFFICE
CERTIFICATE OF CORRECTION

PATENT NO.         : 7,161,748 B2  
APPLICATION NO. : 10/938338  
DATED              : January 9, 2007  
INVENTOR(S)       : Nishide Page 1 of 1

It is certified that error appears in the above-identified patent and that said Letters Patent is hereby corrected as shown below:

Claim 3 (col. 10, line 22), replace "earn" with --cam--.

Claim 4 (col. 10, line 24), replace "cain" with --cam--.

Claim 4 (col. 10, line 27), replace "cain" with --cam--.

Claim 4 (col. 10, line 28), replace "earn" with --cam--.

Signed and Sealed this

Fifth Day of June, 2007

JON W. DUDAS  
*Director of the United States Patent and Trademark Office*